(12) United States Patent
Zhou

(10) Patent No.: US 7,844,731 B1
(45) Date of Patent: Nov. 30, 2010

(54) SYSTEMS AND METHODS FOR ADDRESS SPACING IN A FIREWALL CLUSTER

(75) Inventor: Steven Y. Zhou, Bedford, MA (US)

(73) Assignee: Symantec Corporation, Cupertino, CA (US)

( * ) Notice: Subject to any disclaimer, the term of this patent is extended or adjusted under 35 U.S.C. 154(b) by 1274 days.

(21) Appl. No.: 10/712,396

(22) Filed: Nov. 14, 2003

(51) Int. Cl.
G06F 15/173 (2006.01)
(52) U.S. Cl. .................. 709/238; 709/245; 370/401
(58) Field of Classification Search .............. 709/238, 709/245; 370/401
See application file for complete search history.

(56) References Cited

U.S. PATENT DOCUMENTS

| | | | | |
|---|---|---|---|---|
| 5,197,002 A * | 3/1993 | Spencer | ................. | 705/34 |
| 5,970,058 A * | 10/1999 | DeClerk et al. | ........... | 370/331 |
| 6,052,788 A * | 4/2000 | Wesinger et al. | .......... | 726/11 |
| 6,154,813 A * | 11/2000 | Martin et al. | .............. | 711/133 |
| 6,157,955 A * | 12/2000 | Narad et al. | .............. | 709/228 |
| 6,160,811 A * | 12/2000 | Partridge et al. | ......... | 370/401 |
| 6,212,558 B1 * | 4/2001 | Antur et al. | ............... | 709/221 |
| 6,233,686 B1 * | 5/2001 | Zenchelsky et al. | ........ | 726/1 |
| 6,301,257 B1 * | 10/2001 | Johnson et al. | ......... | 370/406 |
| 6,317,837 B1 * | 11/2001 | Kenworthy | .............. | 726/11 |
| 6,396,928 B1 * | 5/2002 | Zheng | .................. | 380/285 |
| 6,742,045 B1 * | 5/2004 | Albert et al. | ............. | 709/238 |
| 6,748,401 B2 * | 6/2004 | Blackburn et al. | ............ | 1/1 |
| 6,880,089 B1 * | 4/2005 | Bommareddy et al. | ....... | 726/11 |
| 6,885,633 B1 * | 4/2005 | Mikkonen | ............. | 370/217 |
| 6,963,913 B2 * | 11/2005 | Komisky | .............. | 709/225 |
| 6,975,729 B1 * | 12/2005 | Perlman | ............... | 380/277 |
| 7,047,453 B2 * | 5/2006 | Lappin, Jr. | ................ | 714/52 |
| 7,054,867 B2 * | 5/2006 | Bosley et al. | ............. | 707/10 |
| 7,055,173 B1 * | 5/2006 | Chaganty et al. | .......... | 726/11 |
| 7,107,609 B2 * | 9/2006 | Cheng et al. | ................ | 726/3 |
| 7,133,400 B1 * | 11/2006 | Henderson et al. | ........ | 370/389 |
| 7,133,405 B2 * | 11/2006 | Graham et al. | ........... | 370/392 |
| 7,185,041 B1 * | 2/2007 | End, III | .................. | 708/656 |
| 7,188,180 B2 * | 3/2007 | Larson et al. | ............ | 709/227 |
| 7,209,962 B2 * | 4/2007 | Boden | .................. | 709/223 |
| 7,219,152 B2 * | 5/2007 | Komisky | ................ | 709/225 |
| 7,272,646 B2 * | 9/2007 | Cooper et al. | ............. | 709/223 |
| 7,286,529 B1 * | 10/2007 | Thomas | ................. | 370/389 |
| 7,295,512 B2 * | 11/2007 | Takatani et al. | ........... | 370/229 |
| 7,299,353 B2 * | 11/2007 | Le Pennec et al. | ......... | 713/159 |
| 7,302,700 B2 * | 11/2007 | Mao et al. | .................. | 726/11 |
| 7,353,276 B2 * | 4/2008 | Bain et al. | .............. | 709/225 |
| 7,401,355 B2 * | 7/2008 | Supnik et al. | ............... | 726/11 |
| 7,406,534 B2 * | 7/2008 | Syvanne et al. | ........... | 709/238 |
| 2002/0019933 A1 * | 2/2002 | Friedman et al. | .......... | 713/160 |
| 2003/0043805 A1 * | 3/2003 | Graham et al. | ........... | 370/392 |
| 2003/0046423 A1 * | 3/2003 | Narad et al. | .............. | 709/238 |
| 2003/0115485 A1 * | 6/2003 | Milliken | ................. | 713/201 |
| 2003/0140142 A1 * | 7/2003 | Marples et al. | ........... | 709/225 |
| 2003/0154410 A1 * | 8/2003 | Drell | ................... | 713/201 |

(Continued)

*Primary Examiner*—John Follansbee
*Assistant Examiner*—Saket K Daftuar
(74) *Attorney, Agent, or Firm*—Finnegan, Henderson, Farrabow, Garrett & Dunner LLP

(57) ABSTRACT

Systems and methods consistent with the present invention provide an address that does not conflict with other addresses. In one embodiment, a method includes receiving, at a first processor, a first packet; determining as a function of a multidimensional space for representing addresses processed by a set of data processors, a first address for the first packet; forwarding the first packet based on the determined first address.

28 Claims, 8 Drawing Sheets

U.S. PATENT DOCUMENTS

| | | |
|---|---|---|
| 2003/0167410 A1* | 9/2003 | Rigstad et al. ............... 713/201 |
| 2003/0200439 A1* | 10/2003 | Moskowitz ................. 713/176 |
| 2004/0013112 A1* | 1/2004 | Goldberg et al. ............ 370/389 |
| 2004/0054925 A1* | 3/2004 | Etheridge et al. ........... 713/201 |
| 2004/0090966 A1* | 5/2004 | Thomas ................. 370/395.52 |
| 2004/0093430 A1* | 5/2004 | Thomas ...................... 709/245 |
| 2004/0103205 A1* | 5/2004 | Larson et al. ............... 709/229 |
| 2004/0172557 A1* | 9/2004 | Nakae et al. ................. 713/201 |
| 2005/0076145 A1* | 4/2005 | Ben-Zvi et al. ............. 709/245 |
| 2005/0108617 A1* | 5/2005 | Lappin, Jr. .................. 714/781 |

* cited by examiner

US 7,844,731 B1

SYSTEMS AND METHODS FOR ADDRESS SPACING IN A FIREWALL CLUSTER

BACKGROUND OF THE INVENTION

I. Field of the Invention

The present invention generally relates to communication systems and, in particular, to systems and methods for determining addresses.

II. Background and Material Information

A firewall protects the resources of a private network from users (or computers) of other, untrusted networks. The firewall may consist of a set of programs that regulate the flow of traffic into and out of a network. The set of programs may include rules that represent a security policy for the firewall. For example, an enterprise with an intranet that allows its workers access to the wider Internet may install a firewall to control access to the enterprise's own private data resources and to control what outside Internet resources the enterprise's users may access. A firewall may also include (or work with) a proxy server that makes network requests (i.e., to establish connections and exchange packets) on behalf of intranet users. In some situations, a firewall may be a specially designated computer separate from the rest of the computers on a network, such that no incoming packets (or connections) from or to an untrusted network can directly access computers on the enterprise's intranet.

Since a firewall essentially serves to control the flow of packets between a trusted network (e.g., an enterprise or corporate intranet) and an untrusted network (e.g., the Internet), the firewall may be burdened with a large amount of network traffic. To address problems that flow from significant network traffic some have used a firewall cluster. The firewall cluster includes a plurality of firewalls (also referred to as firewall nodes). By using multiple firewall nodes, the firewall cluster can handle more traffic as compared to a single firewall node. However, the introduction of firewall clusters presents unique problems, such as coordinating the activities of all of the firewall nodes in the cluster.

SUMMARY OF THE INVENTION

Accordingly, the present invention is directed to systems and methods for determining outgoing source addresses in a set of nodes, and, more particularly, for determining such addresses in a firewall cluster.

In one embodiment consistent with the present invention, there are provided systems and methods for receiving, at a first node, a first packet. Moreover, systems and methods are provided for determining as a function of a multidimensional space for representing addresses processed by a set of data processors, a first address for the first packet. Furthermore, systems and methods are provided for forwarding the first packet based on the determined first address.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1:
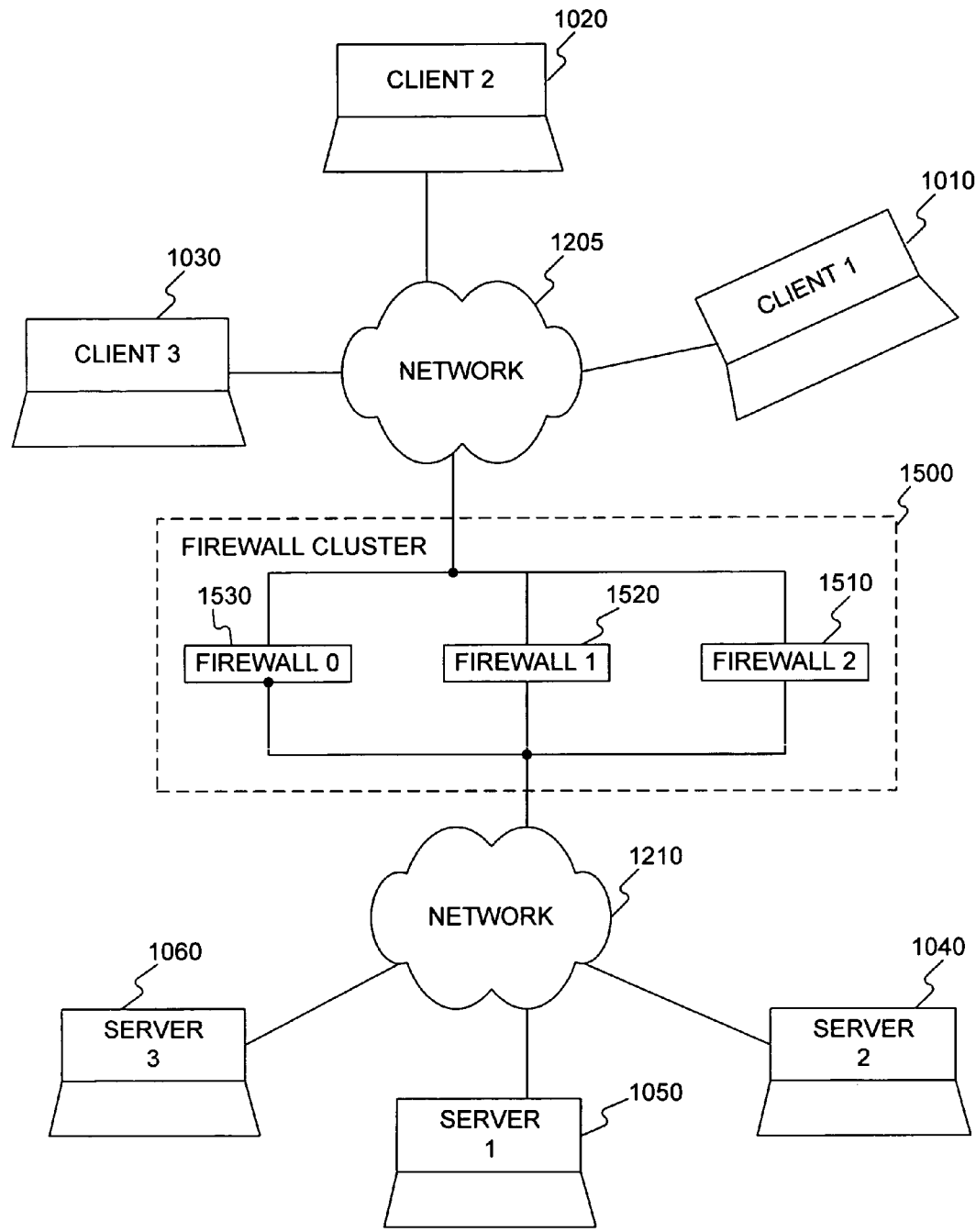
FIG. 1 illustrates an exemplary system environment in accordance with systems and methods consistent with the present invention.

FIG. 1 includes a set of clients 1010-1030, a first network 1205, a firewall cluster 1500, a second network 1210, and a set of servers 1040-1060. Firewall cluster 1500 may further include one or more firewall nodes 1510-1530.

In one embodiment consistent with the present invention, a firewall node (e.g., a firewall node of a cluster) may receive a packet and before sending the packet to its destination, the firewall node determines a source address for the packet, such that the address does not conflict with source addresses assigned by the other firewall nodes.

In one embodiment, the firewall node makes the address based on a multidimensional space assigned to the firewall node making the determination, with the address being representative of a Transport Control Protocol (TCP) connection. The multidimensional space is also referred to as an N-tuple space. The term N-tuple space means multiple in degree N. For example, a 2-tuple space represents a two-dimensional space (or region), a 3-tuple represents a three-dimensional space, and so forth. For example, a firewall node may be assigned a region in N-tuple space that is separate from and does not conflict with any other region assigned to other firewall nodes of the firewall cluster. As such, when the firewall node determines an address based on its assigned N-tuple space, the resulting address does not conflict with an address assigned by one of the other firewall nodes.

Figure 5:
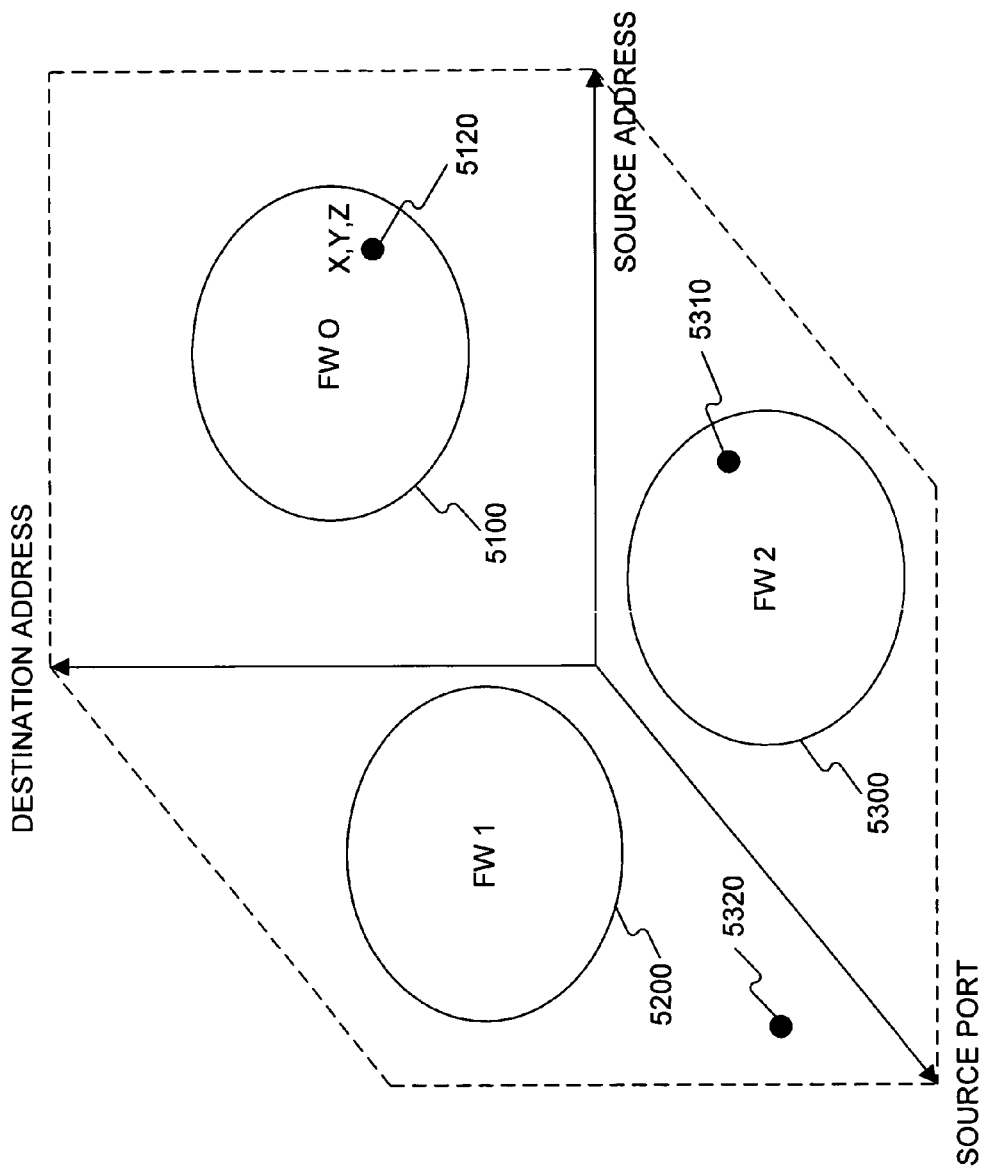
FIG. 5 illustrates a three-tuple space in accordance with systems and methods consistent with the present invention.

An address of a packet may represent any value that may be used to identify the packet, its source, and its destination. In the case of a TCP packet, the connection may be defined by one or more of the following: a source address, a source port address, a destination address, a destination port address (also known as a port number), and a protocol byte. If five values are used as an address to identify the connection (e.g., a source addresses, a source port address, a destination address, a destination port address, and a protocol byte), these five values are a 5-tuple address that represent a point in 5-tuple space. As such, when a firewall node determines a 5-tuple address based on its assigned region in 5-tuple space, the 5-tuple address cannot conflict with other addresses determined based on other regions in 5-tuple space, which are assigned to the other firewall nodes 1520-1530 of cluster 1500. A 5-tuple space cannot be readily visualized; FIG. 5 (described below) depicts a 3-tuple space.

Clients 1010-1030 may function to establish connections by sending and/or receiving packets through first network 1205 to firewall cluster 1500. Each of the clients may be embodied in the form of a data processing system or computer, as described in greater detail below with respect to FIG. 2.

First network 1205 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication medium. In one embodiment, first network 1205 may be configured as an intranet, such as a corporate intranet, where security with respect to the public Internet is a concern.

Firewall cluster 1500 may include one or more firewall nodes 1510-1530. Each firewall node may include hardware and/or software that functions to protect first network 1205 and/or client processors 1010-1030. Moreover, the structure of each firewall node may be a data processor (e.g., a computer) and/or a communication device (e.g., a router). Firewall cluster 1500 may also include an arbitrator (not shown) that selects which one of the firewall nodes 1510-1530 will process a packet and its corresponding connection from a client processor. The arbitrator may be embodied as a data processor separate from each of the firewall nodes or, alternatively, may be embodied within one or more of the firewall nodes. The firewall node selected by the arbitrator may then receive the packet and serve to proxy a packet connection to servers 1040-1060 through second network 1210.

Second network 1210 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication medium. In one embodiment, second network 1210 may be configured as the Internet.

Servers 1040-1060 may function to provide information, such as files, web pages, and other services to clients 1010-1030. Each of the servers may be embodied in the form of a data processing unit (described in greater detail below with respect to FIG. 2). One of ordinary skill in the art would recognize that at times a server may function as client and that a client may function as server.

Figure 2:
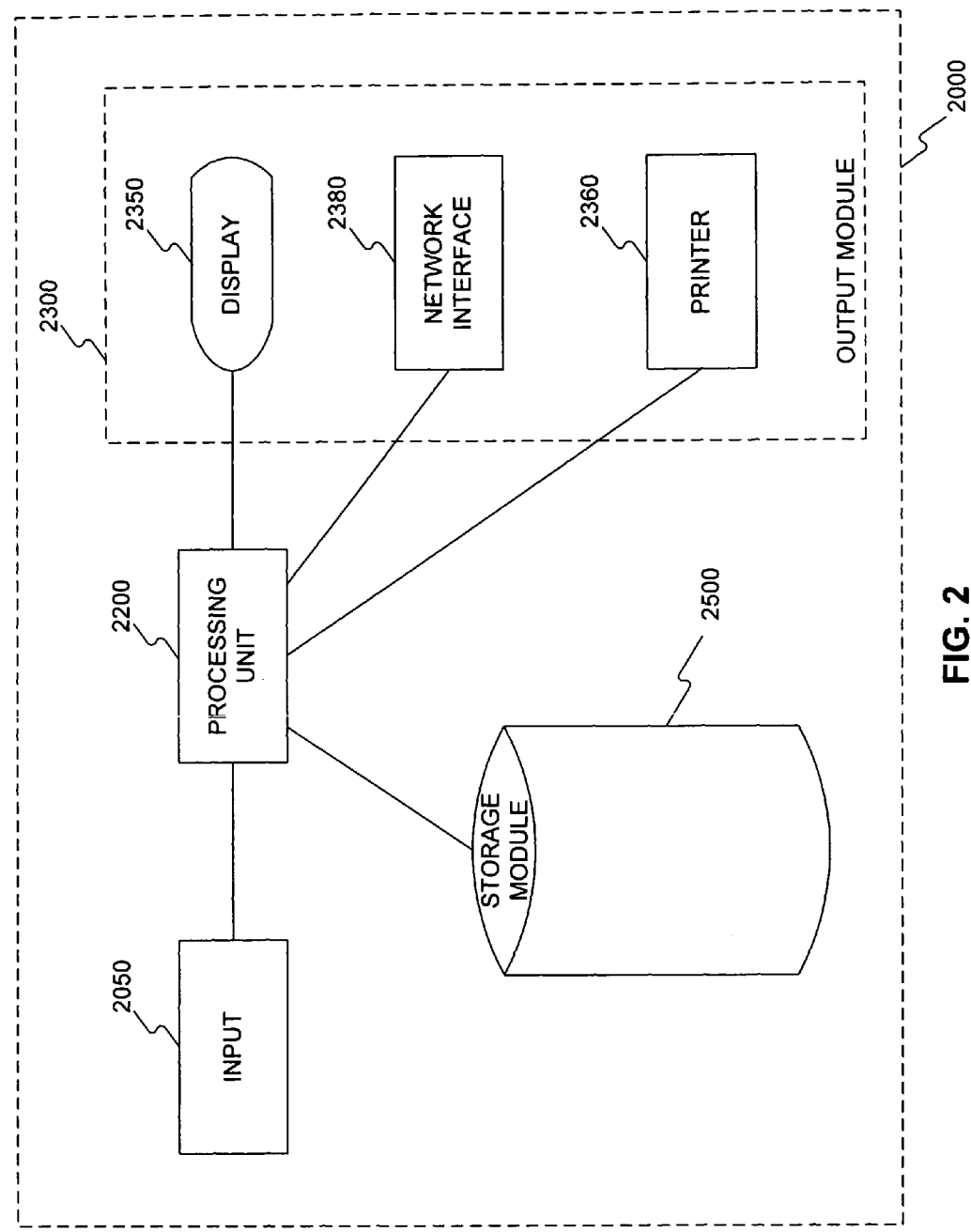
FIG. 2 is an exemplary data processor in accordance with systems and methods consistent with the present invention.

The data processing unit included in each of the clients 1010-1030, firewall nodes 1510-1530, and servers 1040-1060 may be implemented as a computer 2000, such as the one depicted in general block diagram form at FIG. 2. Computer 2000 may include an input module 2050, a processor 2200, a storage module 2500, and/or an output module 2300.

The output module 2300 may include one or more input/output (I/O) devices including a display 2350, a printer 2360, and a network interface 2380. Network interface 2380 enables computer 2000 to communicate through a network, such as network 1205 and network 1210. For example, network interface 2380 may be embodied as an Ethernet network interface card or a wireless LAN interface card, such as cards compatible with the IEEE 802.11 series of standards.

Input module 2050 of FIG. 2 may be implemented with a variety of I/O devices to receive a user's input and/or provide the input to processing unit 2200. Some of these devices may include, for example, a keyboard, a mouse, an input storage device, a network interface card, and a modem.

Processing unit 2200 may include, for example, one or more of the following: a central processing unit, a co-processor, memory, registers, and other processing devices and systems as appropriate. Although FIG. 2 illustrates only a single processor unit 2200, computer 2000 may alternatively include a set of processing units.

Storage module 2500 may be embodied with a variety of components or subsystems capable of providing storage including, for example, a hard drive, an optical drive, a general-purpose storage device, a removable storage device, and/or memory. Further, although storage module 2500 is illustrated in FIG. 2 as being separate or independent from data processing unit 2200, storage module 2500 and data processing unit 2200 may be implemented as part of a single platform or system.

Although data processing unit 2200 is generally described in terms of computer 2000, data processing unit 2200 may also be incorporated into any other data processing or communication device including, for example, a router, a gateway, a bridge, a firewall, a network security system, a wireless (or portable) device, and/or a network management system.

Figure 3:
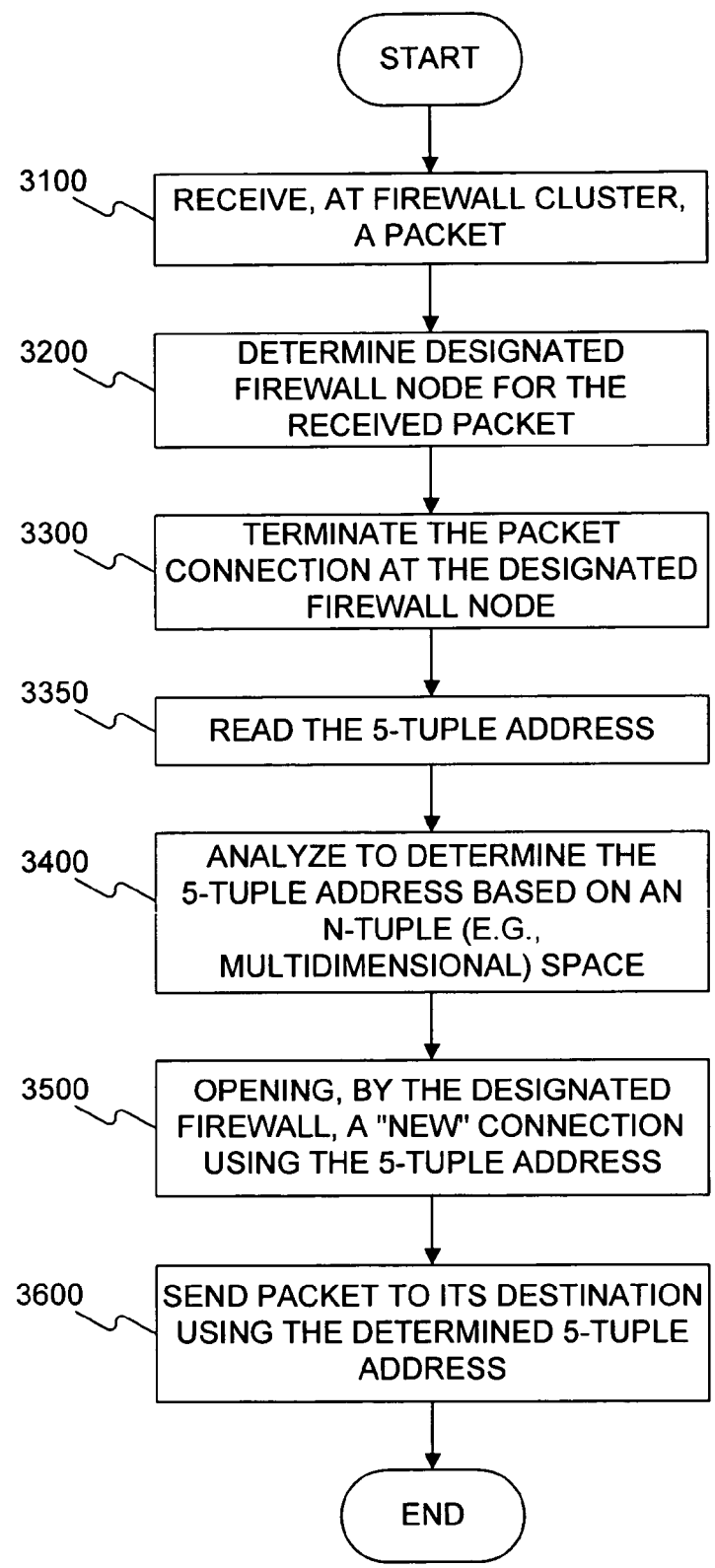
FIG. 3 is an exemplary flowchart depicting steps for determining a source address of an outgoing connection associated with a firewall in accordance with systems and methods consistent with the present invention.

FIG. 3 is an exemplary flowchart depicting steps for determining a 5-tuple address for a packet based on a 5-tuple space consistent with an embodiment of the present invention. Referring to FIGS. 1 and 3, client 1010 may attempt to make a connection to server 1050 by sending an Internet Protocol (IP) packet to destination server 1050 through first network 1205. Firewall cluster 1500 (or an arbitrator therein) may receive the IP packet from client 1010 (being on the routed path from 1010 to 1050) and select which of the firewall nodes 1510-1530 will further process the packet and any corresponding Transport Control Protocol (TCP) connection (steps 3100-3200). For example, firewall cluster 1500 may designate firewall node 1510 to receive the packet and serve as a proxy firewall—terminating thus the TCP connection from client 1010 (step 3300). Firewall cluster 1500 may then read a 5-tuple address associated with the packet and analyze the 5-tuple address based on a 5-tuple space, such that the determined 5-tuple address does not conflict with any other 5-tuple address used by the other firewall nodes of the firewall cluster (steps 3350-3400). As such, when firewall node 1510 opens a new connection to server 1050 using the determined 5-tuple address, firewall node 1510 sends the packet using the determined 5-tuple address, without any addressing conflicts (steps 3500-3600) with the other nodes 1520-1530.

Figure 4A:
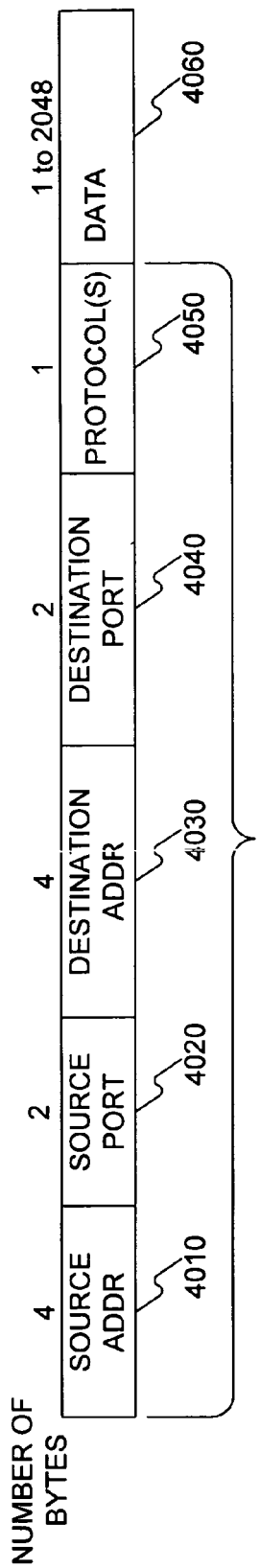
FIG. 4A is an exemplary packet received by a firewall cluster in accordance with systems and methods consistent with the present invention.
Figure 4B:
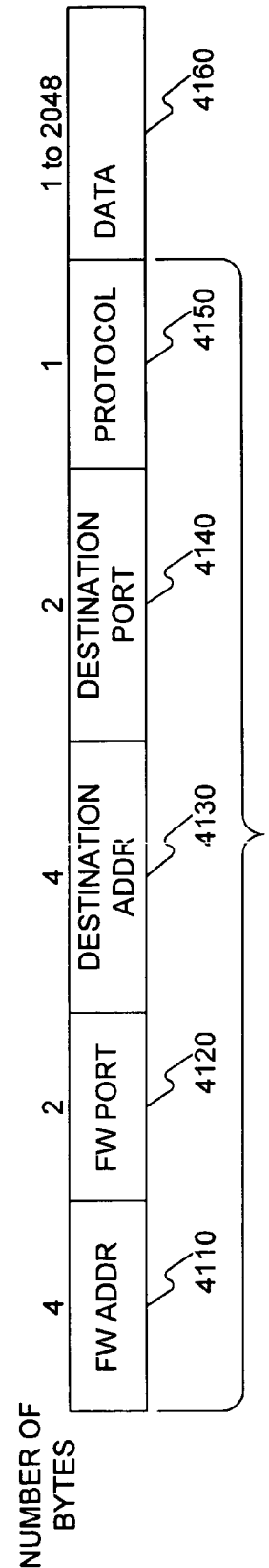
FIG. 4B is an exemplary packet sent by a firewall cluster in accordance with systems and methods consistent with the present invention.

Before providing a detailed description of steps 3100-3600, a description of the 5-tuple address is now provided with reference to FIGS. 4A and 4B. FIG. 4A shows an IP packet (e.g., the packet received by firewall node 1510 in step 3100) with a 4-byte source address 4010, a 2-byte source port address 4020, a 4-byte destination address 4030, a 2-byte destination port address 4040, a 1-byte protocol 4050, and a variable number of data bytes 4060. The term 5-tuple address refers to the five address values of the packet, namely, source address 4010, source port 4020, destination address 4030, destination port 4040, and protocol 4050. Source address 4010 describes the source of a packet, for example, the sender, within the network. The source port address 4020 describes a logical connection at the source. The destination address 4030 describes the destination of a packet, for example, the receiver, within the network. The destination port 4040 describes a logical connection (e.g., port address 80 represents the well-known port for hyper text transfer protocol (http) connections) at the destination. Lastly, the protocol describes the protocol associated with the packet (e.g., TCP, UDP, etc.). Table 1 below lists exemplary values for a 5-tuple address. Referring to Table 1, source address 4010 may be represented as an IP address as depicted in Table 1.

TABLE 1

EXEMPLARY 5-TUPLE VALUES

| SOURCE ADDR 4010 | SOURCE PORT 4020 | DESTINATION ADDR 4030 | DESTINATION PORT 4040 | PROTOCOL 4050 |
|---|---|---|---|---|
| 192.168.1.1 | 4096 | 200.1.9.1 | 80 | 5 |

For security reasons, some firewalls replace one or more of the values of the 5-tuple address when sending packets, such as replacing source address 4010 with a firewall address associated with firewall cluster 1500, as depicted in FIG. 4B. Moreover, the source port address 4020 may also be replaced with a value not yet assigned locally (e.g. a value between 1024 and 65535). When this is the case, however, there is a likelihood that two firewall nodes will use the same outgoing 5-tuple address on two different packets corresponding to two different connections. For example, when two client processors 1010-1020 send packets to access the same web site (e.g., server), the clients 1010-1020 may send respective packets to the same website. Each of the packets may have the same website destination address 4030, website destination port 4040, and website protocol 4050 (e.g., http). Firewall node 1510 may then receive the respective packet from client 1010, replace the packet source address with the firewall cluster's address, for example, 10.10.1.10, and replace the packet source port address (or number) with a value, for example, 4096. Meanwhile, firewall node 1520 may receive the respective packet from client 1020, replace the packet source address with the address of 10.10.1.10, and replace the packet source port address with a value of 4096. Even though the source port numbers are independently assigned by the firewall nodes, this example demonstrates that there is a likelihood (or probability) that packets from different clients 1010-1020 will have the same 5-tuple address, i.e., the same source address 4110 of 10.10.1.10, the same source port 4120 of 4096, the same destination address 4130 of the website, the same destination port 4140 of the website, and the same protocol 4150 of http. The same 5-tuple addresses thus result in a conflict, since two different packets share the same 5-tuple address. As such, packets from two different clients can no longer be distinguished—resulting in a lost or denied connection.

To eliminate such conflicts, a firewall node may determine a 5-tuple address for a received packet that avoids any addressing conflicts with other firewall nodes of the firewall cluster. In particular, a firewall node (e.g., firewall node 1510) may determine a 5-tuple address for an outbound packet (or connection), such that the 5-tuple address is based on an address region assigned to firewall node 1510. For example, each firewall node may be assigned its own region of addresses in N-tuple space that does not conflict with another region assigned to any other firewall node of the firewall cluster. As such, a packet sent by firewall node 1510 (depicted in FIG. 4B) may only use a 5-tuple address from the address region assigned to firewall node 1510.

Since it is difficult to draw a five dimensional space, FIG. 5 depicts an exemplary 3-tuple space including source address, source port, and destination address. Referring to FIG. 5, each firewall node is assigned its own region of addresses in 3-tuple space. Firewall node zero 1530 is assigned region 5100, firewall node one 1520 is assigned region 5200, and firewall node two 1510 is assigned region 5300. For example, firewall node 1530 may determine a 3-tuple address having a value of X, Y, Z, with X representative of a source address, Y representative of a source port, and Z representative of a destination address. As can be seen by FIG. 5, the 3-tuple address X, Y, Z (labeled 5120) does not conflict with the 3-tuple address used by other firewall nodes. Moreover, the use of a N-tuple address determined based on an N-tuple space may provide more flexibility when compared to merely pre-assigning source port numbers to each firewall node to avoid address conflicts. Although the use of a 3-tuple addresses and 5-tuple addresses are described herein, any dimension of N-tuple addresses may be used instead.

Referring again to FIGS. 1 and 3, to receive a packet from client 1010 (or network interface 2380 therein) (step 3100), firewall cluster 1500 may listen for a packet with its address, such as a Media Access Control (MAC) address specifying a physical interface associated with the firewall cluster. Alternatively, firewall cluster 1500 (on the routed path to network 1210) may receive any packets with IP addresses not within its (sub)network, namely first network 1205, since such packets may traverse firewall cluster 1500 to reach second network 1210 and servers 1040-1060.

To designate (or select) which of the firewall nodes 1510-1530 will further process the packet and any corresponding TCP connection, firewall cluster 1500 (or arbitrator therein) may randomly assign a packet to one of the firewall nodes 1510-1530. Subsequent packets from the same connection may be sent to the same firewall node as the arbitrator, when the arbitrator uses a symmetric routing algorithm, which is known and commercially available. Alternatively, firewall cluster 1500 may assign the packet to a firewall with the least amount of load (or traffic). One of ordinary skill in the art would recognize that any other way of arbitrating may be used instead. Moreover, such arbitrators are known and commercially available.

As noted above, the selected firewall node (e.g., firewall node 1510) may act as a proxy firewall. When this is the case, firewall node 1510 may terminate the TCP connection associated with the received packet from client 1010 (step 3300). Moreover, firewall node 1510 may use one or more rules (stored in storage module 2500) to determine whether to forward the packet to its destination. A rule may regulate the flow of packets based on packet content, such as preventing a packet to be delivered to a predetermined destination address or prohibiting a protocol, such as a file transfer protocol (ftp) request. If the rules permit the packet to be forwarded, firewall node 1510 may later open (see, e.g., step 3500) another TCP connection to the packet destination address, such as server 1050.

Before opening up a connection or sending a packet to destination server 1050, firewall node 1510 may read the 5-tuple address associated with the packet (step 3350). The 5-tuple address is then processed to determine whether the 5-tuple address is within the region of addresses assigned to firewall node 1510 in 5-tuple space (step 3400). If the 5-tuple address is within the assigned region in 5-tuple space, firewall node 1510 may send the packet with the 5-tuple address to destination server 1050. If the 5-tuple address is not within the assigned region in 5-tuple space, firewall node 1510 may determine another modified 5-tuple address for the packet. The modified 5-tuple address is determined such that the modified address is within a 5-tuple address region assigned to firewall node 1510. Exemplary steps associated with determining whether the 5-tuple address is within the assigned region and determining a modified 5-tuple address are described below with respect to FIG. 6. By way of example, FIG. 5 depicts a 5-tuple address 5310 that is within the region assigned to firewall node two 1510, while 5-tuple address 5320 depicts a 5-tuple that is not within the assigned region of node 1510. Referring again to FIG. 3, firewall node 1510 may send the packet with the modified 5-tuple address to destination server 1050 through second network 1210, with the packet having a 5-tuple address that does not conflict with any of the other firewall nodes 1520-1530 (step 3500-3600).

Figure 6:
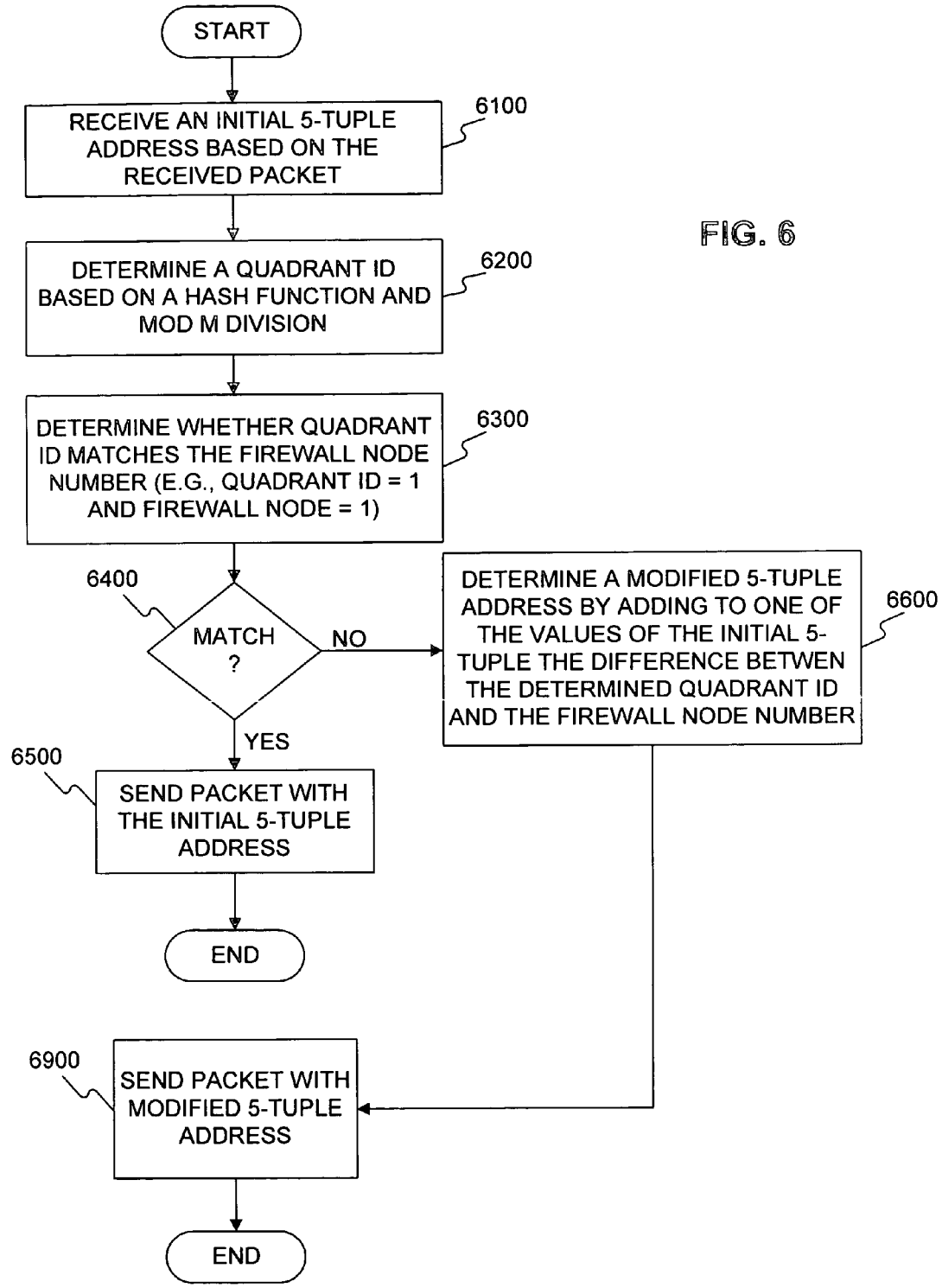
FIG. 6 is another exemplary flowchart depicting steps for determining an N-tuple address in accordance with systems and methods consistent with the present invention.

FIG. 6 depicts exemplary steps for determining an N-tuple address. Client 1010 may attempt to make a TCP connection to server 1050 by sending IP packets to destination server 1050 through first network 1205. Firewall cluster 1500 may then receive the IP packet from client 1010 and select one of the firewall nodes 1510-1530 to further process the packet and the corresponding TCP connection. For example, selected firewall node 1510 may read the 5-tuple address associated with the received IP packet, replace the packet source address (e.g., 4010 at FIG. 4A) with the firewall cluster address (e.g., 4110), and determine whether the packet's 5-tuple address is within the region in 5-tuple space assigned to firewall node 1510. If so, firewall node 1510 may send the packet with the 5-tuple address. If that 5-tuple address is not within the region in 5-tuple space assigned to firewall node 1510, firewall node 1510 may determine a new (or modified) 5-tuple address and then send the packet to its destination.

To determine a 5-tuple address, firewall node 1510 may start with a 5-tuple value and use that 5-tuple value as an initial 5-tuple address (step 6100). Firewall cluster 1510 may determine a quadrant identifier based on a hash function (step 6200), and determine whether the quadrant identifier corresponds to the firewall node number (step 6300). If the quadrant identifier matches the firewall node number, indicating the 5-tuple address is within the node's assigned region in 5-tuple space, the packet is sent with the initial 5-tuple address (steps 6400-6500). If the quadrant identifier does not match the firewall node number, firewall node 1510 may determine a modified 5-tuple address by adjusting one of the 5-tuple address values (step 6600). Firewall node 1510 may send the packet to its destination using the modified 5-tuple address (step 6900). The following provides a more detailed description of steps 6100-6900, with reference to FIGS. 6-8.

Firewall node 1510 may use a 5-tuple value representative of the firewall cluster 1500 address and use that 5-tuple as an initial 5-tuple address (step 6100). For example, firewall node 1510 may read a 5-tuple address depicted in FIG. 4A, i.e., source address 4010, source port 4020, destination address 4030, destination port 4040, and protocol 4050. Firewall node 1510 may replace source address 4010 with firewall address 4110 and replace source port 4020 with firewall port 4120 (see FIGS. 4A and 4B) and then determine a quadrant identifier for the 5-tuple address based on a function, such as a hash function (step 6200). Generally, a hash function maps something into something else. For example, a hash function may map (or transform) a string of characters or numbers, such as bits or bytes, into a shorter length string or value of bits or bytes. In this case, the hash function maps the 13 bytes of the 5-tuple address to a 1-byte value, which is then modulo divided by the total number of firewall nodes to yield a quadrant identifier.

Although the embodiment above uses the firewall cluster 1500 address as an initial address, any other 5-tuple value may be used instead.

Figure 7:
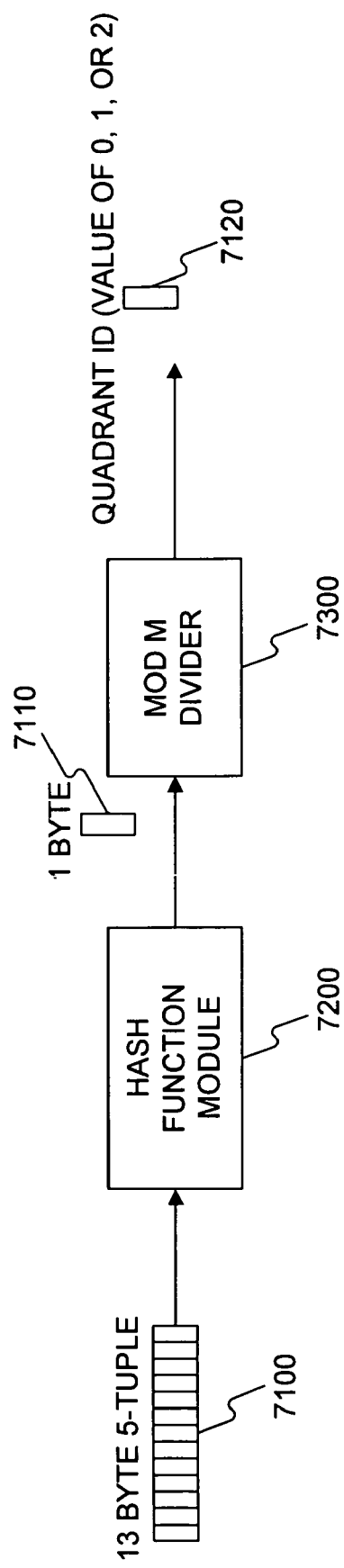
FIG. 7 is a functional block diagram for determining a quadrant identifier based on a hash function in accordance with systems and methods consistent with the present invention.

FIG. 7 depicts in block diagram form, a system for determining the quadrant identifier using a hash function and modulo division. Referring to FIG. 7, a 5-tuple having 13 bytes serves as an input to a Hash Function Module 7200. Hash Function Module 7200 may determine a 1-byte hash value. In one embodiment, the Hash Function Module 7200 may sum all of the bytes of the 13-byte 5-tuple address and then truncate the answer to eight bits (or 1-byte). One skilled in the art would understand that any other hash function or transform that maps an N-tuple address to another value may be used instead. The 1-byte output of the Hash Function Module 7200 may further serve as an input to Modulo M divider 7300. Modulo M divider 7300 may function to Modulo M divide the 1-byte output 7110, with M equal to the number of firewall nodes. Returning to the above embodiment depicted in FIG. 1 having three firewall nodes, Output 7120 of the Modulo M divider 7300 is equal to the following:

$$\text{Output} = \text{Remainder}(\text{Hash Function}_{output} \div \text{Firewall}_{number})$$

where Output 7120 is the output value of the Modulo M divider 7300; Hash Function$_{output}$ is the output value of Hash Function Module 7200 (e.g., a 1-byte value between 0 and 255), Firewall$_{number}$ represents the number of firewall nodes in firewall cluster 1500 (e.g., a value of 3), and Remainder represents the remainder value of the division operation. In this example, the value of Output 7120 may be one of three possible values 0, 1, or 2 (or, alternatively 1, 2, or 3). The quadrant identifier 7120 may thus have three possible values, namely, zero, one, or two, which represents the three regions assigned to the corresponding three firewalls.

Figure 8:
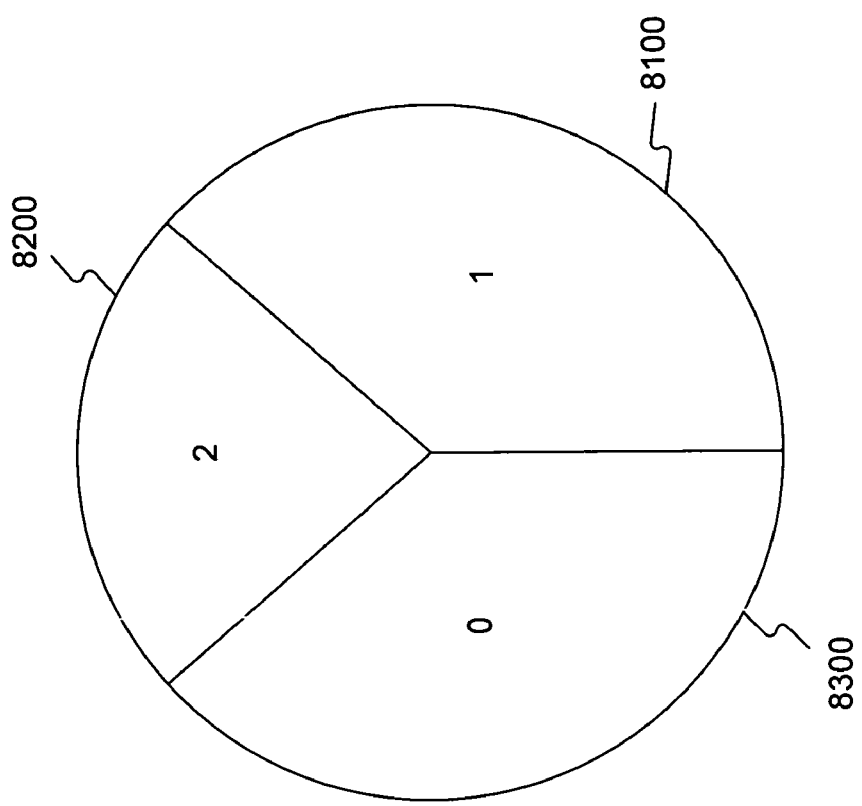
FIG. 8 depicts three quadrant identifiers and respective firewall nodes in accordance with systems and methods consistent with the present invention.

FIG. 8 depicts three quadrants labeled with corresponding quadrant identifier values 8100, 8200, and 8300. As can be seen, the three quadrant identifiers represent one of the three firewall nodes 1510-1530. As such, when a 13-byte 5-tuple address results in a quadrant identifier value of zero, the 5-tuple address is within quadrant zero 8300, which in this example is assigned firewall node zero 1530. Similarly, if a 5-tuple address results in a quadrant identifier of value of two, the 5-tuple address is within quadrant two, which in this example is assigned firewall node two 1510. By using the Hash Function Module 7200 and Modulo M divider 7300, firewall cluster 1500 may determine, based on the quadrant identifier, whether a 5-tuple address is within a firewall node's assigned region in 5-tuple space. For example, if firewall zero 1530 determines that a 5-tuple address has a quadrant identifier of "2" 8200, then the 5-tuple address cannot be used by firewall node zero 1530 (or by node 1520).

One of ordinary skill would recognize that any other approach may be used to determine whether a 5-tuple address is within an assigned region in N-tuple space including, for example, neural networks and Euclidean distance classifiers (e.g., mean squared or least squared error classifiers).

Referring again to FIG. 6, with the quadrant identifier determined, firewall cluster 1500 (or a firewall node therein) may then determine whether the quadrant identifier corresponds to the firewall node (step 6300). As noted above, if the quadrant identifier value is two for a 5-tuple address associated with firewall node two 1510, the quadrant identifier matches the firewall node number, namely, two. As such, the initial 5-tuple address is within the correct region in 5-tuple space assigned to firewall node two 1510. The firewall node, such as firewall node 1510, may then send the packet to its destination server with that initial 5-tuple (steps 6400-6500).

If the quadrant identifier does not match the firewall node number, firewall node 1510 may determine a modified 5-tuple address by adding to one of the 5-tuple address values, the difference between the quadrant identifier and desired quadrant identifier value (i.e., the firewall node number) (step 6600). For example, when the quadrant identifier is one, firewall node 1510 may determine a modified 5-tuple address by first determining the difference between the quadrant identifier (e.g., one) and firewall node number of node 1520 (e.g., two). The difference, in this case equal to a value of two, is then added to any one of the following: source address 4010, source port 4020, destination address 4030, destination port 4040, and protocol 4050. In one embodiment, firewall node 1510 may add the quadrant identifier (e.g., equal to a value of one) to a source port value (e.g., equal to a value of 4096), with the modified 5-tuple having a new source port value of 4097. Although the description herein refers to a packet, such as an IP packet, any datagram or information transformation mechanism may be used instead.

Systems and methods consistent with the present invention may thus use a multidimensional address space for determining an address of a packet, such that addressing conflicts are eliminated. Moreover, the use of the multidimensional address space may enable a firewall cluster to operate in a high traffic network environment with reduced addressing conflicts.

The systems disclosed herein may be embodied in various forms including, for example, a data processing unit, such as a computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method for addressing packets in a firewall cluster within a single network, the firewall cluster including a plurality of firewall nodes comprising one or more processing units, the method comprising:

selecting, from the firewall cluster within the single network, a first firewall node for processing a first packet, the first firewall node being assigned to a first node number;

receiving, at a first processing unit associated with the first firewall node, the first packet;

modifying, by the first processing unit, a first address of the first packet into a first modified address such that a quadrant identifier determined using a hash function and modulo division from the first modified address corresponds to the first node number assigned only to the first firewall node;

selecting, from the firewall cluster within the single network, a second firewall node for processing a second packet, the second firewall node being assigned to a second node number;

receiving, at a second processing unit associated with the second firewall node, the second packet, the second processing unit being different than the first processing unit;

modifying, by the second processing unit, a second address of the second packet into a second modified address such that a quadrant identifier determined using a hash function and modulo division from the second modified address corresponds to the second node number assigned only to the second firewall node, wherein the second modified address of the second packet does not conflict with the first modified address of the first packet;

forwarding the first packet based on the first modified address; and forwarding the second packet based on the second modified address.

2. The method of claim 1, further comprising:
assigning to the first firewall node a first region based on a N-tuple space.

3. The method of claim 2, further comprising:
using the first address of the first packet, such that the first address represents a point within the first region.

4. The method of claim 3, further comprising:
using N address values as the N-tuple, such that the N address values represent the point.

5. The method of claim 1, further comprising:
using a N-tuple space, such that N is equal to a value of at least two.

6. The method of claim 2, further comprising:
assigning to the second firewall node a second region based on the N-tuple space, such that the first region is separate from the second region.

7. A method for addressing packets associated with a plurality of processing units, each processing unit being associated with one of a plurality of firewall nodes in a firewall cluster within a single network, the method comprising:

selecting, from the firewall cluster within the single network, one of the firewall nodes for processing a packet, the selected firewall node including a first processing unit;

receiving, at the first processing unit, the packet;

reading, at the first processing unit, an N-tuple address of the received packet;

determining, by the first processing unit, whether the N-tuple address of the received packet is within an N-tuple space assigned to the first processing unit based on a quadrant identifier and a firewall node number corresponding to the N-tuple space assigned to the first processing unit, wherein an N-tuple space assigned to each of the plurality of processing units is different, and wherein the quadrant identifier is determined from the N-tuple address using a hash function and modulo division;

sending the packet with the N-tuple address, when it is determined that the N-tuple address is within the N-tuple space assigned to the first processing unit;

determining, when the N-tuple address of the received packet is not within the N-tuple space assigned to the first processing unit, a modified N-tuple address based on the N-tuple space assigned to the first processing unit, such that the modified N-tuple address does not conflict with addresses assigned by any of the other plurality of processing units; and sending the packet based on the modified N-tuple address.

8. The method of claim 7, wherein the reading step further comprises:

reading as the N-tuple address, a plurality of values from the received packet.

9. The method of claim 8, wherein the reading step further comprises:

reading at least a source port.

10. The method of claim 7, wherein the step of determining the modified N-tuple further comprises:

adding a value to the N-tuple address, such that the modified N-tuple address is within the N-tuple space assigned to the first processing unit.

11. The method of claim 7, further comprising:

using a computer as the first processing unit.

12. The method of claim 7, further comprising:

using a router as the first processing unit.

13. A method of addressing packets in a firewall cluster within a single network, wherein the firewall cluster comprises a set of processing units, each processing unit being associated with a firewall node, the method comprising:

selecting, from the firewall cluster within the single network, one of the firewall nodes for processing a packet, the selected firewall node including a first processing unit;

receiving, at the first processing unit, the packet;

reading, at the first processing unit, an N-tuple address of the received packet;

determining a quadrant identifier based on the read N-tuple address, a hash function, and modulo division;

determining whether the read N-tuple address corresponds to the first processing unit based on the quadrant identifier;

sending the packet with the N-tuple address, when the quadrant identifier corresponds to the first processing unit;

determining, when the quadrant identifier does not correspond to the first processing unit, a modified N-tuple address that corresponds to the first processing unit, such that the modified N-tuple address does not conflict with addresses assigned by any of the other processing units; and sending the packet based on the modified N-tuple address.

14. The method of claim 13, further comprising:

assigning each of the set of processing units a firewall node number.

15. The method of claim 14, further comprising:

determining whether the N-tuple address corresponds to the first processing unit based on the quadrant identifier and the firewall node number.

16. A system for addressing packets in a firewall cluster within a single network, the firewall cluster including a plurality of firewall nodes, the system comprising:

a memory; and a processor configured to:

select, from the firewall cluster within the single network, a first firewall node for processing a first packet, the first firewall node being assigned to a first node number;

receive at a first processing unit associated with the first firewall node, the first packet;

modify a first address of the first packet into a first modified address such that a quadrant identifier determined using a hash function and modulo division from the first modified address corresponds to the first node number assigned only to the first firewall node;

select from the firewall cluster within the single network, a second firewall node for processing a second packet, the second firewall node being assigned to a second node number;

receive at a second processing unit associated with the second firewall node, the second packet, the second processing unit being different than the first processing unit;

modify a second address of the second packet into a second modified address such that a quadrant identifier determined using a hash function and modulo division from the second modified address corresponds to the second node number assigned only to the second firewall node, wherein the second modified address of the second packet does not conflict with the first modified address of the first packet;

forward the first packet based on the first modified address; and forward the second packet based on the second modified address.

17. A system for addressing packets associated with one or more processing units, each processing unit being associated with a firewall node in a firewall cluster within a single network, the system comprising:

a memory; and a processor configured to:

select, from the firewall cluster within the single network, one of the firewall nodes for processing a packet, the selected firewall node including a first processing unit;

receive, at the first processing unit, the packet;

read, at the first processing unit, an N-tuple address of the received packet;

determine whether the N-tuple address of the received packet is within an N-tuple space assigned to the first processing unit based on a quadrant identifier and a firewall node number corresponding to the N-tuple space assigned to the first processing unit, wherein the N-tuple space assigned to each of the processing units is different, and wherein the quadrant identifier is determined from the N-tuple address using a hash function and modulo division;

send the packet with the N-tuple address, when it is determined that the N-tuple address is within an N-tuple space assigned to the first processing unit;

determine, when the N-tuple address of the received packet is not within the N-tuple space assigned to the first processing unit, a modified N-tuple address based on the N-tuple space assigned to the first processing unit, such that the modified N-tuple address does not conflict with addresses assigned by any of the other processing units; and send the packet based on the modified N-tuple address.

18. A firewall cluster within a single network including firewall nodes associated with processing units, comprising:

a memory; and a processor configured to:
- select, from the firewall cluster within the single network, one of the firewall nodes for processing a packet, the selected firewall node including a first processing unit;
- receive, at the first processing unit, the packet;
- read, at the first processing unit, an N-tuple address of the received packet;
- determine a quadrant identifier based on the read N-tuple address, a hash function, and modulo division;
- determine whether the read N-tuple address corresponds to the first processing unit based on the quadrant identifier;
- send the packet with the N-tuple address, when the quadrant identifier corresponds to the first processing unit;
- determine, when the quadrant identifier does not correspond to the first processing unit, a modified N-tuple address that corresponds to the first processing unit, such that the modified N-tuple address does not conflict with addresses assigned by any of the other processing units; and
- send the packet based on the modified N-tuple address.

19. A system including a firewall cluster within a single network including a plurality of firewall nodes, the firewall nodes being associated with one or more processing units, said system comprising:

at least one memory comprising:
- code that selects, from the firewall cluster within the single network, a first firewall node for processing a first packet, the first firewall node including a first processing unit, the first firewall node being assigned to a first node number;
- code that receives, at the first processing unit, the first packet;
- code that modifies a first address of the first packet into a first modified address such that a quadrant identifier determined using a hash function and modulo division from the first modified address corresponds to the first node number assigned only to the first firewall node;
- code that selects, from the firewall cluster within the single network, a second firewall node for processing a second packet; the second firewall node including a second processing unit, the second firewall node being assigned to a second node number;
- code that receives, at the second processing unit, the second packet, the second processing unit being different than the first processing unit;
- code that modifies a second address of the second packet into a second modified address such that a quadrant identifier determined using a hash function and modulo division from the second modified address corresponds to the second node number assigned only to the second firewall node, wherein the second modified address of the second packet does not conflict with the first modified address of the first packet;
- code that forwards the first packet based on the first modified address; and
- code that forwards the second packet based on the second modified address; and at least one processing unit for executing the code.

20. A system including a firewall cluster within a single network including a plurality of firewall nodes, the firewall nodes being associated with processing units, the system comprising:

at least one memory comprising:
- code that selects, from the firewall cluster within the single network, one of the firewall nodes for processing a packet, the selected firewall node including a first processing unit;
- code that receives, at the first processing unit, the packet;
- code that reads, at the first processing unit, an N-tuple address of the received packet;
- code that determines whether the N-tuple address of the received packet is within an N-tuple space assigned to the first processing unit based on a quadrant identifier and a firewall node number corresponding to the N-tuple space assigned to the first processing unit, wherein an N-tuple space assigned to each of the processing units is different, and wherein the quadrant identifier is determined from the N-tuple address using a hash function and modulo division;
- code that sends the packet with the N-tuple address, when it is determined that the N-tuple address is within the N-tuple space assigned to the first processing unit;
- code that determines, when the N-tuple address of the received packet is not within the N-tuple space assigned to the first processing unit, a modified N-tuple address based on the N-tuple space assigned to the first processing unit, such that the modified N-tuple address does not conflict with addresses assigned by any of the other processing units; and
- code that sends the packet based on the modified N-tuple address; and at least one processing unit for executing the code.

21. The system of claim 20, wherein code that reads further comprises:
- code that reads as the N-tuple address, a plurality of values from the received packet.

22. The system of claim 21, wherein code that reads the plurality of values further comprises:
- code that reads at least a source port.

23. A firewall cluster including a plurality of firewall nodes within a single network, the firewall nodes being associated with processing units, the firewall cluster comprising:

at least one memory comprising
- code that selects, from the firewall cluster within the single network, one of the firewall nodes for processing a packet, the selected firewall node including a first processing unit;
- code that receives, at the first processing unit, the packet;
- code that reads, at the first processing unit, an N-tuple address of the received packet;
- code that determines a quadrant identifier based on the read N-tuple address, a hash function, and modulo division;
- code that determines whether the read N-tuple address corresponds to the first processing unit based on the quadrant identifier;
- code that sends the packet with the N-tuple address, when the quadrant identifier corresponds to the first processing unit;
- code that determines, when the quadrant identifier does not corresponds to the first processing unit, a modified N-tuple address that corresponds to the first processing unit, such that the modified N-tuple address does not conflict with addresses assigned by any of the other processing units; and
- code that sends the packet based on the modified N-tuple address; and at least one processing unit for executing the code.

24. A non-transitory computer-readable storage medium comprising instructions which, when executed by a processing unit, perform a method for addressing packets in a firewall cluster within a single network, the firewall cluster including a plurality of firewall nodes, the method including:

selecting, from the firewall cluster within the single network, one of the firewall nodes for processing a packet, the selected firewall node being associated with a first processing unit;

receiving, at the first processing unit, the packet;

reading, at the first processing unit, an N-tuple address of the received packet;

determining whether the N-tuple address of the received packet is within an N-tuple space assigned to the first processing unit based on a quadrant identifier and a firewall node number corresponding to the N-tuple space assigned to the first processing unit, wherein an N-tuple space assigned to each of the processing units is different, and wherein the quadrant identifier is determined from the N-tuple address using a hash function and modulo division;

sending the packet with the N-tuple address, when it is determined that the N-tuple address is within the N-tuple space assigned to the first processing unit; and determining, when it is determined that the N-tuple address of the received packet is not within the N-tuple space assigned to the first processing unit, a modified N-tuple address based on the N-tuple space assigned to the first processing unit, such that the modified N-tuple address does not conflict with addresses assigned by any of the other processing units; and sending the packet based on the modified N-tuple address.

25. The non-transitory computer-readable storage medium of claim 24, wherein reading further comprises:

reading as the N-tuple address, a plurality of values from the received packet.

26. The non-transitory computer-readable storage medium of claim 25, wherein reading the plurality of values further comprises:

reading at least a source port.

27. A non-transitory computer-readable storage medium comprising instructions which, when executed by a processing unit, perform a method for addressing packets in a firewall cluster within a single network, the firewall cluster including a plurality of firewall nodes, the method including:

selecting, from the firewall cluster within the single network, one of the firewall nodes for processing a packet, the selected firewall node including a first processing unit;

receiving, at the first processing unit, the packet;

reading, at the first processing unit, an N-tuple address of the received packet;

determining a quadrant identifier based on the read N-tuple address, a hash function, and modulo division;

determining whether the read N-tuple address corresponds to the first processing unit based on the quadrant identifier;

sending the packet with the N-tuple address, when the quadrant identifier corresponds to the first processing unit;

determining, when the quadrant identifier does not corresponds to the first processing unit, a modified N-tuple address that corresponds to the first processing unit, such that the modified N-tuple address does not conflict with addresses assigned by any of the other processing units; and sending the packet based on the modified N-tuple address.

28. A non-transitory computer-readable storage medium comprising instructions which, when executed by a processing unit, perform a method for addressing packets in a firewall cluster within a single network, the firewall cluster including a plurality of firewall nodes comprising one or more processing units, the method including:

selecting, from the firewall cluster within the single network, one of the firewall nodes within the single network for processing a first packet, the selected firewall node being associated with a first processing unit and assigned to a first node number;

receiving, at the first processing unit, the first packet;

modifying a first address of the first packet into a first modified address such that a quadrant identifier determined using a hash function and modulo division from the first modified address corresponds to the first node number assigned only to the selected firewall node;

selecting, from the firewall cluster within the single network, a second firewall node for processing a second packet, the second firewall node being assigned to a second node number;

receiving, at a second processing unit associated with the second firewall node, the second packet, the second processing unit being different than the first processing unit;

modifying, by the second processing unit, a second address of the second packet into a second modified address such that a quadrant identifier determined using a hash function and modulo division from the second modified address corresponds to the second node number assigned only to the second firewall node, wherein the second modified address of the second packet does not conflict with the first modified address of the first packet;

forwarding the first packet based on the first modified address; and forwarding the second packet based on the second modified address.

* * * * *

UNITED STATES PATENT AND TRADEMARK OFFICE
CERTIFICATE OF CORRECTION

| | | |
|---|---|---|
| PATENT NO. | : 7,844,731 B1 | Page 1 of 1 |
| APPLICATION NO. | : 10/712396 | |
| DATED | : November 30, 2010 | |
| INVENTOR(S) | : Steven Y. Zhou | |

It is certified that error appears in the above-identified patent and that said Letters Patent is hereby corrected as shown below:

On the Title Page, Item (74), in the "*Attorney, Agent, or Firm*", line 2 "Farrabow," should read --Farabow--.

In claim 2, column 10, lines 34-35, "a N-tuple" should read --an N-tuple--.

In claim 5, column 10, line 43, "a N-tuple" should read --an N-tuple--.

In claim 23, column 14, lines 59-60, "does not corresponds" should read --does not correspond--.

In claim 27, column 16, lines 9-10, "does not corresponds" should read --does not correspond--.

Signed and Sealed this
Tenth Day of April, 2012

David J. Kappos
*Director of the United States Patent and Trademark Office*